(12) United States Patent
Zamir

(10) Patent No.: US 10,579,404 B2
(45) Date of Patent: *Mar. 3, 2020

(54) PROVISIONING VIRTUAL DESKTOPS WITH STUB VIRTUAL DISKS

(71) Applicant: VMware, Inc., Palo Alto, CA (US)

(72) Inventor: Tal Zamir, Haifa (IL)

(73) Assignee: VMware, Inc., Palo Alto, CA (US)

( * ) Notice: Subject to any disclaimer, the term of this patent is extended or adjusted under 35 U.S.C. 154(b) by 39 days.

This patent is subject to a terminal disclaimer.

(21) Appl. No.: 15/398,244

(22) Filed: Jan. 4, 2017

(65) Prior Publication Data

US 2017/0116009 A1 Apr. 27, 2017

Related U.S. Application Data

(63) Continuation of application No. 14/741,573, filed on Jun. 17, 2015, now Pat. No. 9,547,513.

(51) Int. Cl.
*G06F 9/46* (2006.01)
*G06F 9/455* (2018.01)
*G06F 9/451* (2018.01)

(52) U.S. Cl.
CPC .......... *G06F 9/45533* (2013.01); *G06F 9/452* (2018.02); *G06F 9/45558* (2013.01); *G06F 2009/45595* (2013.01)

(58) Field of Classification Search
CPC .............. G06F 9/45533; G06F 9/45558; G06F 2009/45595
See application file for complete search history.

(56) References Cited

U.S. PATENT DOCUMENTS

| | | | | |
|---|---|---|---|---|
| 5,845,273 A * | 12/1998 | Jindal | .................... | G06F 16/319 |
| 6,718,427 B1 * | 4/2004 | Carlson | ................. | G06F 3/0617 |
| | | | | 360/48 |
| 9,020,987 B1 * | 4/2015 | Nanda | ....................... | G06F 3/06 |
| | | | | 707/821 |
| 2010/0257523 A1 * | 10/2010 | Frank | .................. | G06F 9/45558 |
| | | | | 718/1 |
| 2012/0084381 A1 * | 4/2012 | Alladi | ..................... | G06F 9/544 |
| | | | | 709/213 |
| 2012/0304168 A1 | 11/2012 | Raj Seeniraj | | |
| 2013/0185699 A1 | 7/2013 | Oguma | | |
| 2014/0297603 A1 | 10/2014 | Kim | | |
| 2015/0227357 A1 * | 8/2015 | Zamir | ....................... | G06F 8/65 |
| | | | | 717/173 |
| 2015/0227384 A1 * | 8/2015 | Zamir | ....................... | G06F 8/65 |
| | | | | 718/1 |

* cited by examiner

*Primary Examiner* — Camquy Truong

(57) ABSTRACT

A system is described allowing a virtual desktop to be booted directly from a desktop image stored in a backup database without requiring content from the desktop image to be copied into the virtual disk of the virtual machine hosting the virtual desktop. The hosting virtual machine contains a synthetic virtual disk acting as a stub disk by redirecting read requests targeted for the synthetic disk from the guest operating system to corresponding locations of the storage where the desktop image is kept.

17 Claims, 4 Drawing Sheets

PROVISIONING VIRTUAL DESKTOPS WITH STUB VIRTUAL DISKS

CLAIM OF PRIORITY

This application is a Continuation application of, and claims benefit of, U.S. patent application Ser. No. 14/741,573, which was filed Jun. 17, 2015, the disclosure of which is incorporated by reference herein in its entirety.

TECHNICAL FIELD

The present disclosure generally relates to virtual desktop infrastructure and more specifically to techniques for efficient provisioning of virtual desktops in enterprise network environments.

BACKGROUND

Virtual desktops are becoming more and more commonplace in today's work environments. The security of having a remotely stored desktop, ability to access the desktop from any location and on various devices, centralized management, the efficient use of hardware resources, among other benefits made possible by virtual desktop infrastructure (VDI) is a large benefit for many organizations. Hence, the concept of using VDI to provide users with virtual desktops in the cloud is appealing to a growing number of enterprises.

In a conventional VDI environment, each user in an enterprise is provisioned a virtual desktop and is allowed to access their virtual desktop over a remote network connection, such as a WAN connection. The virtual desktops are typically hosted on servers that reside in a data center of the enterprise (or a third party service provider), and each host server may execute multiple virtual desktops. Users can utilize a client device to remotely log into their individual virtual desktop and all of the application execution takes place on the remote host server which is linked to the local client device over a network using a remote display protocol, such as remote desktop protocol (RDP), PC-over-IP protocol (PCoIP), virtual network computing (VNC) protocol, or the like. Using the remote desktop protocol, the user can interact with applications of the virtual desktop, which are running on the remote host server, with only the display, keyboard, and mouse information communicated with the local client device. A common implementation of this approach is to host multiple desktop operating system instances on separate virtual machines deployed on a server hardware platform running a hypervisor.

However, successful deployment of VDI in an enterprise poses several challenges. For example, VDI must provide cost-effective dedicated desktops, in which users still have the diversity and personalization they are used to (e.g. installing custom applications and storing a large number of documents), while reducing the cost of storage and computing resources required for handling the user workloads. One challenge in today's systems is that the underlying storage in VDI must be of large capacity and high performance, as it contains all operating system (OS) files, applications, and user data, and must respond quickly to a massive amount of input and output (TO) requests from various virtual desktops running from the storage.

Also, IT needs to be able to continue supporting users with physical devices, co-existing with the virtual desktops. Furthermore, the system should enable fast transition from the physical desktop to the virtual desktop (e.g. for business continuity in case of disaster). Today, migrating existing full physical desktops into the cloud to enable a virtual desktop is a long and complicated process that requires copying the entire contents of each physical desktop into the corresponding virtual disks, which also consumes a lot of storage space. In addition, maintaining synchronization between the virtual desktop and the physical desktop for when the user returns to using the physical desktop is a significant problem. Further, IT needs to be able to provision and update operating systems, applications, and perform other IT tasks in the same way both for physical and for virtual desktops, ideally without having to duplicate the effort.

Meeting these challenges traditionally required expensive high-end storage devices storing full block-level desktop images and extensive IT involvement. The common approach for meeting these requirements is to dedicate a virtual machine per user, with varying solutions for storing the various desktop image components (the operating system, IT-provisioned applications, user-installed applications, user data, and settings). For example, a simple storage solution that is widely used is to have a "full clone" of a virtual machine disk for every virtual desktop. Each full clone contains an entire block-level desktop image. However, this solution wastes a lot of storage, as the entire operating system and all IT- and user-installed applications are duplicated across many virtual machine disks. Some solutions, such as "linked clones," reduce storage needs to some extent by allowing multiple VMs to share a base or "parent" virtual disk that contains the core operating system (OS), while changes of each VM are written to a separate delta disk for each VM. This enables de-duplicating the core OS files, however, user data, installed applications and customized settings are not de-duplicated. Furthermore, with linked clone technology, each virtual delta disk consumes increasingly more storage over time as blocks are being written to the delta disk, which in turn requires either a periodic "refresh" operation that discards all user-installed apps or a resource-intensive garbage collection operation for reclaiming unused blocks.

A more efficient approach is desirable for managing virtual desktop infrastructure in enterprise network environments.

DETAILED DESCRIPTION

Figure 1:
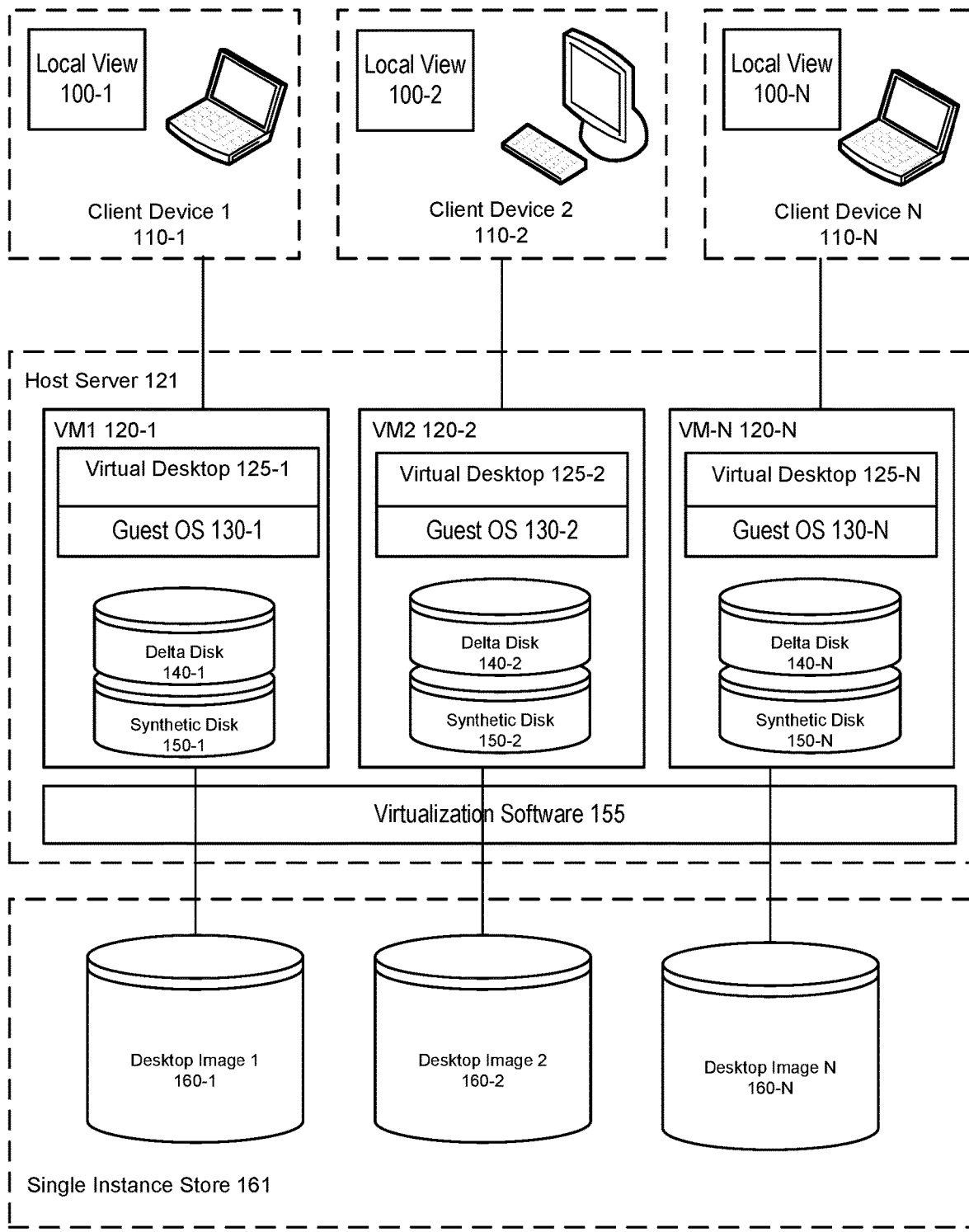
FIG. 1 illustrates an example architecture of a system for provisioning virtual desktops with synthetic virtual disks, in accordance with various embodiments.

Systems and methods in accordance with various embodiments of the present disclosure overcome at least some of the above mentioned shortcomings and deficiencies by providing more efficient ways to provision virtual desktops in enterprise environments. In particular, embodiments described herein leverage stub virtual disks that allow a virtual machine to be booted directly from a stored desktop image, instead of requiring the entire desktop image to be copied into the virtual disk.

In this VDI architecture, a virtual machine (VM) can boot directly from a desktop image stored in a single instance store (SIS). A SIS is a de-duplicated storage located in an enterprise (typically on a server) where desktop images of user machines are stored, e.g., for backup purposes. The single instance store de-duplicates the stored desktop images such that only one copy of a given file needs to be stored. For example, numerous desktop images can contain pointers to the single copy of the file in the SIS instead of containing duplicate copies of the file. Thus, unique desktop files only need to be stored once in the de-duplicated SIS, dramatically cutting storage costs. Further, an agent that runs on each desktop (or VM) periodically uploads incremental file changes into the SIS as part of an ongoing backup/synchronization process. Accordingly, an up-to-date desktop image of each user's desktop (whether physical or virtual) can be constantly kept in the SIS. An example of a product that implements such a SIS is Mirage by VMware, Inc.

In this approach, instead of containing a full block-level copy of the user's desktop image, as was done in the past, a VM's virtual disk acts as a partial temporary container that redirects file read accesses into corresponding blocks in the SIS where the desktop image is stored. Newly written blocks are temporarily stored in a delta portion of the virtual disk and can be periodically flushed to the desktop image in the SIS. Hence, the proposed mechanism allows VMs to boot directly from SIS-based desktop images by instantly creating a stub, or "synthetic", virtual disk that redirects read requests into the SIS and write requests into a differencing disk. On logoff, the changed files in the delta disk can be flushed into the SIS and the differencing disk can be discarded. Alternatively, the changed files can be periodically flushed to the SIS by an agent operating as a background process on the guest operating system of the VM while the user is using the virtual desktop.

This approach allows VDI deployments to use storage and computing resources more intelligently. The virtual disks, which normally require high-end storage devices in existing solutions, can now be stored on lower quality or cheaper 2nd tier storage, since they are only used to store temporary modifications. Instead, high quality, more expensive 1st tier storage devices of smaller capacity, can be used more effectively to store the de-duplicated SIS, which needs to serve most VM read requests.

In various embodiments, VMs can be completely discarded when not required by the user. Furthermore, the desktop images stored in the SIS enjoy full de-duplication benefits, not just for the common operating system image, but for IT-installed applications, user-installed applications, user data, and settings. In various embodiments, the SIS keeps a single copy for each unique file that is actually used by desktop images and no other blocks. In some embodiments, temporary or non-important files, as defined by policy, are not uploaded to the SIS. This can further reduce storage costs. Notably, the same SIS can be used both to store VDI desktops and physical desktops, reducing the overall cost of enterprise desktop management.

Another advantage of this approach is the support for fast physical to virtual (P2V) transition. For example, in a traditional setting, to transition a user from a physical to a virtual desktop, the user's backup image has to be copied into a corresponding disk in a VM before the user can connect to the VM. This process can take hours or days to complete due to the extensive data copying. In the proposed architecture, a user who doesn't have access to her physical desktop can get near instantaneous access to a virtual machine running her desktop image, since it can be launched from her desktop image in the SIS, which is already continuously kept up-to-date in the SIS as part of a standard backup and synchronization process. Hence, there is no additional data copying taking place in the backend storage to support the user's request for her virtual desktop. Furthermore, migrating a user's virtual desktop into a different virtual host can also be nearly instantaneous, as it only requires booting a VM in a different virtual host, using the same SIS as the source for the desktop image.

Further, this approach offers advantages for managing desktops. For example, when IT performs modifications on a desktop, such as installing or merging a new or an updated application, etc., the changes are transferred to the desktop image in the SIS upon backup or synchronization (e.g., by the agent operating on the desktop). When a virtual machine is booted from the SIS, as described herein, the changes performed by IT automatically appear on the virtual machine. Thus, instead of managing duplicate entities (VM and physical) and having different tools to manage each entity, IT can use the same tools to manage both at the same time.

FIG. 1 illustrates an example architecture of a system for provisioning virtual desktops with synthetic virtual disks, in accordance with various embodiments. As illustrated in the example of FIG. 1, client device 1 110-1, client device 2 110-2, and client device N 110-N provide a local view 100-1, 100-2, and 100-N of virtual desktops 125-1, 125-2, and 125-N being executed on virtual machines VM1 120-1, VM2 120-2, and VM-N 120-N in host server 121. Client devices (e.g., 110-1, 110-2, 110-N) can be personal computers, laptop, tablets, smartphones, or any other computing device. Host server 121 includes virtualization software 155 that supports the execution of one or more virtual machines (e.g., 120-1, 120-2, 120-N). The virtualization software 155 may be a hypervisor, a virtual machine manager (VMM) or other software that allows multiple virtual machines to share the physical resources of the server.

In the illustrated embodiment, each virtual machine (e.g., 120-1, 120-2, 120-N) can execute a guest operating system (e.g., 130-1, 130-2, 130-N) that hosts a virtual desktop (e.g., 125-1, 125-2, and 125-N) for a single user at a time. For example, if five users connect to host server 121 for the purpose of initiating remote desktop sessions, the host server 121 can launch five VMs, each hosting one desktop for each one of the five users. Each client device (e.g., 110-1, 110-2, 110-N) can execute a remote desktop client application (not shown). The interaction between the virtual desktop (e.g., 125-1, 125-2, 125-N) and the client device (e.g., 110-1, 110-2, 110-N) can be facilitated by the remote desktop client application running in the OS on the client device (e.g., 110-1, 110-2, 110-N) that communicates with a server-side remote desktop agent (not shown) that is running on the guest OS (e.g., 130-1, 130-2, 130-N) inside the virtual machine (e.g., 120-1, 120-2, 120-N). In particular, the interaction can be performed by the remote desktop agent transmitting output information (visual display information such as framebuffer information, audio information, etc.) to the remote desktop client and the remote desktop client in turn transmitting user input events (e.g., keyboard, mouse events, etc.) to the remote desktop agent. Communication between the remote desktop agent and the remote desktop client can be through a remote desktop protocol, such as Remote Desktop Protocol (RDP), PC-over-IP protocol (PCoIP), virtual network computing (VNC) protocol, or the like. Using the remote desktop protocol, the user can interact with applications of the virtual desktop (e.g., 125-1, 125-2, and 125-N), which are running on the remote host server 121, with only the display, keyboard, and mouse information communicated by the local client device (e.g., 110-1, 110-2, 110-N).

It should be noted that the particular VDI deployment illustrated in FIG. 1 is shown purely for purposes of illustration and is not intended to be in any way inclusive or limiting to the embodiments that are described herein. For example, an enterprise VDI deployment would include many more host servers which may be distributed over many data centers, which include many other types of devices, such as switches, power supplies, cooling systems and other environmental controls, and the like, which are not illustrated herein. Similarly, a single host server would typically host many more virtual machines than what is shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

A corresponding desktop image 160-1, 160-2, 160-N is stored in a single instance store 161 for each client device 110-1, 110-2, 110-N. Each of the desktop images (e.g., 160-1, 160-2, 160-N) can be an up-to-date desktop image corresponding to a particular user. For example, desktop images 160-1, 160-2, 160-N may be bound to any user devices on the network and be constantly updated as part of a backup/synchronization process. The single instance store 161 can be hosted on a remote server and accessed via a network such as the local area network (LAN). In an embodiment, virtual machines (120-1, 120-2, 120-N) and the single instance store 161 can be hosted on the same server.

Each virtual machine 120-1, 120-2, 120-N contains a synthetic virtual disk 150-1, 150-2, 150-N. As used throughout this disclosure, the terms "synthetic virtual disk" and "stub virtual disk" (e.g., 150-1, 150-2, 150-N) are used interchangeably and refer to a virtual disk that acts as a stub by redirecting certain read requests from a guest OS (e.g., 130-1, 130-2, 130-N) to a corresponding desktop image (e.g., 160-1, 160-2, 160-N) in the single instance store 161. To the guest OS (e.g., 130-1, 130-2, 130-N), the synthetic disk 150-1, 150-2, 150-N may appear as a standard virtual disk while the disk does not actually contain all of the information contained in the desktop image 160-1, 160-2, 160-N but merely redirects certain read requests from the guest OS 130-1, 130-2, 130-N to the SIS 161. In various embodiments, a synthetic disk (e.g., 150-1, 150-2, 150-N) contains certain necessary meta data such as a master file table, security descriptors, directory information, etc. In various embodiments, a synthetic disk (e.g., 150-1, 150-2, 150-N) can be thin-provisioned to conserve storage space and is read-only.

For each VM 120-1, 120-2, 120-N, a delta disk 140-1, 140-2, 140-N can be implemented on top of the synthetic disk (e.g., 152, 154, 156). Write requests (i.e., changes to the desktop image) received from the guest OS 130-1, 130-2, 130-N are directed to the delta disk 140-1, 140-2, 140-N. Subsequently, if a read request is received for a block that has been modified but has not yet been flushed to the SIS, the data that was written to the delta disk 140-1, 140-2, 140-N is read from the delta disk 140-1, 140-2, 140-N by the guest OS 130-1, 130-2, 130-N. Accordingly, the delta disk 140-1, 140-2, 140-N is read/write.

To conserve space, the delta disk 140-1, 140-2, 140-N may be thin provisioned so as not to require the full disk size up front. Thin provisioning, in the context of storage, refers to a known technique of allocating storage to a VM on demand, or at the time the storage is needed. For example, a thin-provisioned VM may be created with an upper limit of 20 gigabytes (GB), but a thin-provisioned storage pool would only give the VM the amount of storage it currently needs, (e.g., 5 GB). In the shared storage pool, the unused 15 GB remains unallocated and available for other VM's to potentially use. Although thin provisioning of storage pools helps avoid wasting storage, this technique may create a potential problem of over-allocation. For example, when more space is promised to a number of VMs than is available in the storage pool, the storage pool is considered "over-committed." If all of the VMs consume all of the storage that they are promised, the storage pool may not be able to satisfy its obligations to each of the VMs. The more over-committed a storage pool becomes, the greater the risk that the storage pool may become full. However, the over-commitment of resources can be addressed by periodically flushing the changes to the SIS and discarding the delta disk, as previously mentioned.

When the guest OS 130-1, 130-2, 130-N reads a block from the synthetic disk 150-1, 150-2, 150-N, if the block is part of a file which resides in the desktop image 160-1, 160-2, 160-N, the block read request is redirected to the SIS 161. Thus, if the SIS is located on a different device than the VM, an IO request would be sent over the network (e.g., LAN) to the server hosting the SIS 161 (or, if the SIS is co-hosted with the requesting VM (e.g., 120-1, 120-2, 120-N), over a local connection such as the host inter-process communication (IPC)). The server containing the SIS 161 would then fetch the correct file block from the underlying storage device on which the SIS is stored and convey it to the requesting VM (e.g., 120-1, 120-2, 120-N). Otherwise, if information is requested that is stored on the synthetic disk 150-1, 150-2, 150-N, such as a master file table block, the block is fetched from the synthetic disk 150-1, 150-2, 150-N directly. When the guest OS 130-1, 130-2, 130-N writes a block, the block gets written to the delta disk 140-1, 140-2, 140-N and therefore any subsequent accesses to this data will be fetched locally from the delta disk 140-1, 140-2, 140-N (until the data is again flushed from the delta disk to the SIS). In various embodiments, this block re-direction is performed transparently at the hypervisor level, without any guest OS e.g., 130-1, 130-2, 130-N intervention, preventing any application compatibility issues.

It should be noted that the solution can be resilient to disk modifications that may be performed by the guest OS 130-1, 130-2, 130-N, including disk defragmentation or any other significant file-system changes, because the synthetic disk 150-1, 150-2, 150-N remains a static read-only disk and all of the changes made by the VM 120-1, 120-2, 120-N are written to the delta disk 140-1, 140-2, 140-3.

In the main use case for this technology, a user has her desktop image (e.g., 160-1) stored in the SIS 161 and can either use this desktop image (e.g., 160-1) natively on a physical machine or login to a VM clone (e.g., 120-1). Behind the scenes, when the user first asks to login to the VM 120-1, the system sets up a synthetic disk 150-1 that is bound to the same desktop image 160-1 in the SIS 161, without performing any file data copy. The system also sets up a delta disk 140-1 to record any file-system changes. When the user logs off, the file-system changes in the delta disk 140-1 can be uploaded back to the SIS 161. Alternatively, the file-system changes in the delta disk 140-1 might not be uploaded back to the SIS 161 if not desired (e.g., if a non-persistent desktop is preferred). At this point, if necessary, it is possible to reclaim the storage of the delta disk 140-1 by simply discarding it and, in this case, the synthetic disk 150-1 will have to be set up again on next login. Alternatively, the virtual machine 120-1 can be suspended and the delta disk 140-1 be kept, so that the user can login quicker later. In various embodiments, the system may contain a portal accessible to the user that allows the user to be able to access an instant virtual machine clone of their physical device in a self-service manner.

Further, to optimize use of storage and bring down system costs, blocks on the delta disks 140-1, 140-2, 140-3 can be stored on lower quality, 2nd tier storage, while blocks on the SIS 161 are stored on higher-end, 1st tier storage. Because the SIS 161 handles a high amount of IO requests from all user VMs (e.g., 120-1, 120-2, 120-N), the highest performing storage can be allocated to it. Furthermore, the system can assign different files in the SIS 161 to different storage tiers based on the relative importance or access frequency to the file, allowing the system to make better use of the underlying storage and providing better value-for-money, while preserving or even improving the user experience. For example, files in the SIS 161 that are accessed most frequently by VMs (e.g., 120-1, 120-2, 120-N) can be placed on highest tier storage.

It should be noted that while in the preferred embodiment desktop images are stored in a single instance store, the system can also be utilized with other types of storage capable of maintaining user desktop images, such as traditional backup storage that doesn't implement the de-duplication techniques of a single instance store.

As described above, when a user requires that her physical desktop be converted into a virtual desktop for the first time, the system needs to set up a synthetic disk that is bound to the user's desktop image in the SIS. After the user logs off, the delta disk can be kept so that subsequent login sessions will not require any set up time. However, as the delta disk may grow in size over time, it may be necessary to discard it occasionally (after flushing contents of the disk to the desktop image in the SIS) and rebuild the synthetic disc. Therefore, it is preferable that the set up time is as quick as possible.

Figure 2:
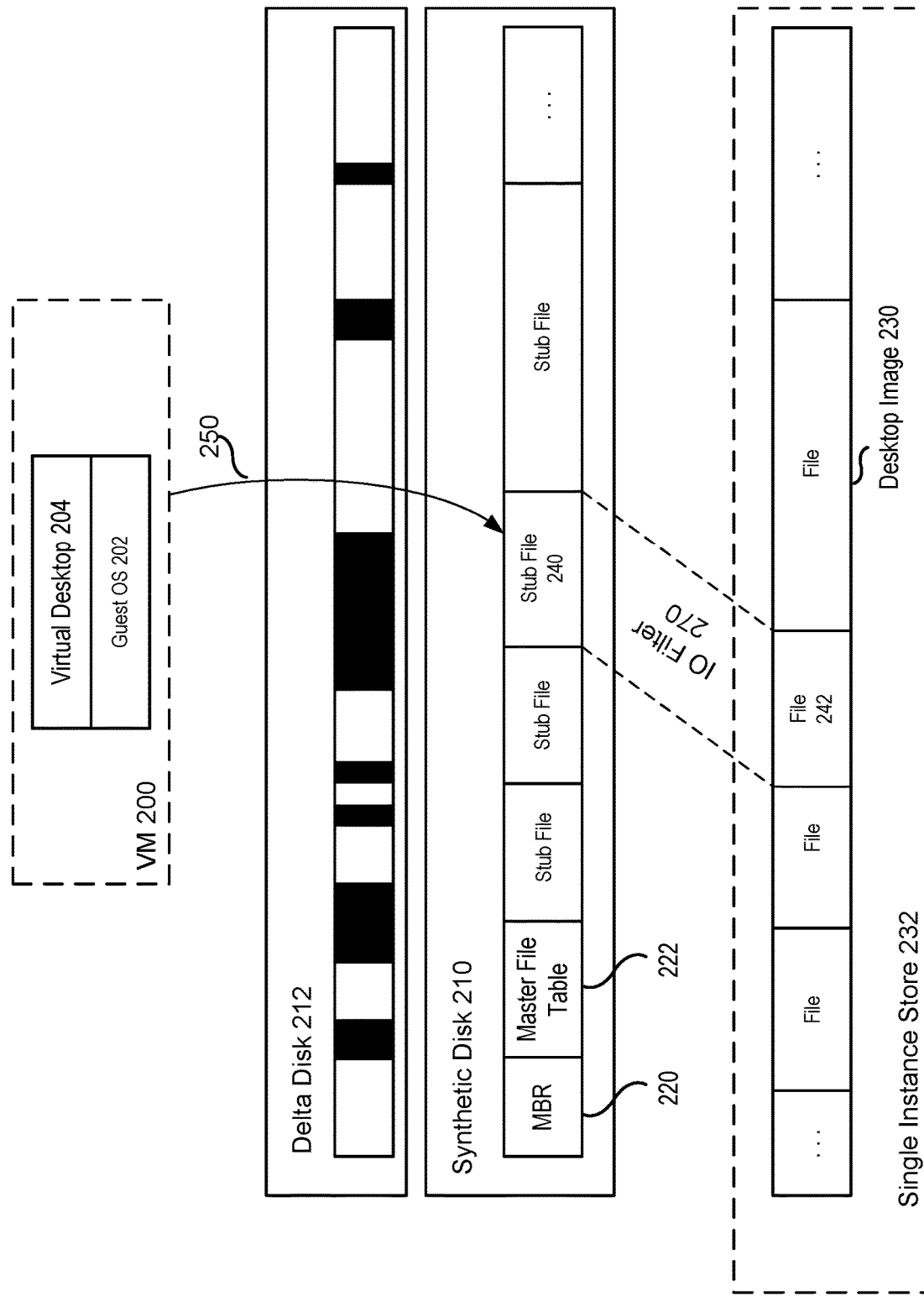
FIG. 2 illustrates a detailed view of a virtual machine implementing a delta disk and a synthetic disk, in accordance with various embodiments.

FIG. 2 illustrates a detailed view of a virtual machine implementing a delta disk and a synthetic disk, in accordance with various embodiments. As illustrated in the example of FIG. 2, virtual machine (VM) 200 hosts a guest operating system 202 on which a virtual desktop 204 runs. A read-only synthetic disk 210 is set up that acts as a stub virtual disk by redirecting read requests from the guest OS 202 to a single instance store 232 where a desktop image 230 is stored.

To enable the system to boot, the synthetic disk 210 contains data that is critical for proper booting of the system. For example, the first sector on the disk can contain a Master Boot Record (MBR) 220. In the case of booting a Windows desktop, this will be the MBR of the Windows operating system. The MBR 220 also contains a partition table defining the disk partitions of the desktop image. In the case of a Windows desktop, the synthetic disk 210 will contain at least one NTFS partition. The NTFS partition contains a NTFS Master File Table (MFT) 222. For each file in the desktop image 230, a stub file is created in the synthetic disk 210 in the corresponding partition. For example, stub file 240 is created in the synthetic disk 210 for file 242 of the desktop image 230.

After the synthetic disk is created, the virtual machine 200 is booted with a disk input-output (TO) filter 270 that intercepts read requests from the guest OS 202 to the synthetic disk 210 and redirects the read requests to the SIS 232. For example, when a read request 250 for block 240 in the synthetic disk 210 is made, the filter 270 instantly determines into which SIS 232 file block 242 of the desktop image 230 the request should be redirected (if at all) and redirects the request. The filter 270 makes the determination based on a mapping relating the synthetic disk 210 to the desktop image 230 in the SIS 232. In various embodiments, the IO filter 270 can be transparent to the VM 200; for example, the IO filter 270 can be at the hypervisor level.

The synthetic disk 210 is only used for read access. A delta disk 212 is set up to enable write access. The delta disk 212 can be a thin-provisioned virtual disk. When the guest OS 202 writes a block, the block gets written to the delta disk 212 and therefore any subsequent accesses to this block will be fetched locally from the delta disk 212, at least until the time that the changes from the delta disk are flushed to the SIS 232.

Figure 3:
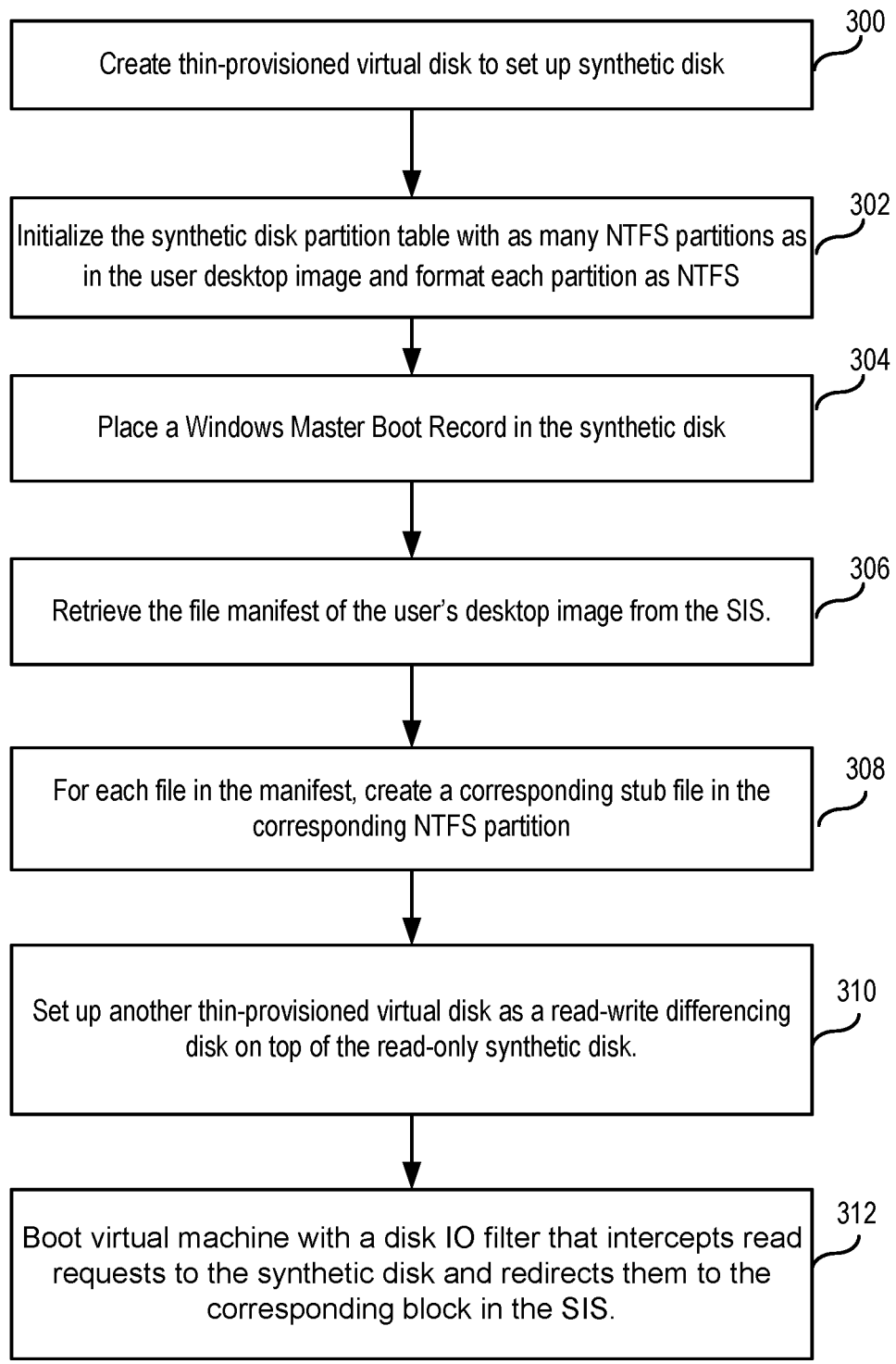
FIG. 3 illustrates a process flow for building a Windows virtual desktop, in accordance with various embodiments.

FIG. 3 illustrates a process flow for building a Windows virtual desktop, in accordance with various embodiments. A blank, thin-provisioned virtual disk is created to set up the synthetic disk in operation 300. The synthetic disk's partition table is initialized with as many NTFS partitions as in the user desktop image and each partition is formatted as NTFS, as shown in operation 302. A Windows Master Boot Record is placed in the synthetic disk (operation 304) to enable the system to boot. In operation 306, the file manifest of the user's desktop image is retrieved from the SIS. For each file in the manifest, a corresponding stub file is created in the corresponding NTFS partition, as shown in operation 308, with the correct file size and with all the other file meta-information (e.g. security information, timestamps, etc.) as in the manifest. This step only performs updates on the Master File Table (MFT) of the NTFS file-system and doesn't place any data in the created files. The synthetic disk is for read only access. Another thin-provisioned virtual disk is set up as a read-write differencing disk on top of the read-only synthetic disk, as shown in operation 310. Afterwards, the virtual machine is booted with a disk IO filter that intercepts read requests to the synthetic disk and redirects them to the corresponding block in the SIS in operation 312.

In various embodiments, the IO filter can redirect read requests based on a mapping of the synthetic disk blocks into their corresponding SIS file blocks. Such a mapping can be a by-product of the synthetic disk build process. For example, the mapping can be obtained by parsing the generated NTFS MFT and collecting the addresses of disk blocks allocated for each file.

Thus, when a read request for a block in offset X is made, the filter instantly determines into which SIS file block the request should be redirected (if at all). A simplistic and fast data structure that can be used to efficiently perform this real-time mapping is a table that maps a disk block offset into a corresponding SIS file index and the offset within that file. In this example implementation, each mapped disk block requires 3 bytes for user file id, supporting up to $2^{24}$ files per user image, and 5 bytes for file offset, allowing each file to be up to 1 TB in size. Therefore, the overall size of this data structure will be: N*8 bytes, where N is the total number of blocks used by files in the synthetic disk. For example, if the total size of files in the user's desktop is 50 GB and each disk block is 4 KB (cluster), the size of this simple data structure would be 8B*(50 GB/4 KB)=100 MB only.

As will be apparent to one skilled in the art, while the example of FIG. 3 illustrates the process for building a Windows virtual desktop, an analogous process can be implemented for other non-Windows systems.

As mentioned above, one of the advantages of the suggested system is fast provisioning of virtual desktops. The time required to complete the process of setting up the synthetic disk is proportional to the number of files in the desktop image (and not to their total size), as the process builds the master file table but doesn't copy any actual file content to the allocated blocks.

In various embodiments, the set up time for building the synthetic disk is only required when the disk is built initially. Subsequently, when the system discards the differencing layer to reclaim space after the user logs off, the system can update the read-only stub layer in the synthetic disk based on a file system delta captured at the SIS. This is a significantly shorter process (i.e. a few seconds) compared to the initial setup, as it only needs to add or remove stub file entries. For example, if a user's desktop is migrated to a virtual desktop for permanent use (as opposed to a temporary disposable virtual desktop), subsequent logins will be near-instantaneous. Such a file system delta can be captured in the SIS by recording incremental changes to the file system of a desktop image that occur after a synthetic disk is formed from the desktop image. Subsequently, the synthetic disk can be updated based on the file system delta by adding or removing stub file entries.

Further, to accelerate the synthetic disk setup process, the disk can be generated on high-end storage (e.g. solid state disk (SSD)). Because the synthetic disk only contains the MFT, it requires little storage space so the expense associated with generating it on expensive storage may be relatively small. In an additional embodiment, instead of initiating the synthetic disk with an empty file-system, the disk can be started with a pre-generated MFT of a similar OS image and the MFT can be fixed to match the file manifest retrieved from the desktop image. This approach could reduce the total number of new files that need to be created in the MFT, thereby shortening the process (e.g. meta-data for all Windows files will already be present).

In various embodiments, the system can optimize the use of storage resources by storing files that are higher priority (e.g., files that are more important or that are accessed more often by virtual machines) into higher quality storage. For example, various statistics can be collected about desktop image files in the SIS, such as which set of files is required for booting the operating system, which set of files is used by each user in the first few minutes after login, and an overall prioritization of all desktop image files, heuristically calculated based on file access and modification timestamps, the Windows prefetching mechanism, well-known paths, etc. Once file priority is determined, the system can place files on storage volumes based on relative priority, significantly shrinking the required capacity of high-end storage volumes. For example, critical OS and application files can be placed in high-end storage volumes (e.g. SSD- or RAM-based storage). On the other hand, user data files that are rarely accessed can be placed in lower-end storage volumes. This approach can result in not only more efficient use of storage resources but also in enhanced user experience.

As mentioned above, the suggested approach also enables rapid physical to virtual migrations. For a physical machine that is already continuously backed up, its full desktop file-system image is already stored in the SIS. If a user device is malfunctioning, disconnected, asleep, or stolen, the user can instantiate a VM running her full desktop quickly by creating a synthetic disk of her desktop image and accessing the VM through another computing device.

After the user logs off from the virtual desktop, all of the changes from the virtual desktop (from the differencing disk) can be uploaded to the SIS to update the user's desktop image. For example, an agent running on the virtual desktop can perform this upload. Subsequently, the user's original physical machine can be updated with all of these changes, including applications, data and settings. These user changes can be applied back to the physical machine using various technologies, such as the layering technology in the product Mirage by VMware, Inc.

Notably, past technologies were able to generate a VM based on an available desktop image; however, those technologies required a significantly longer time that depends on the total file size (e.g. several hours for a large user desktop image), before the user can start working. Past technology also required significantly more IO for fully cloning all files into a virtual disk. The performance boost provide by the suggested approach and the fast P2V cloning is a significant advantage, particularly in self-service business continuity scenarios, where users would not have to wait a long time for a P2V operation to complete.

In various embodiments, the suggested approach enables IT to provision a clean VM to a new user (i.e., a user without an existing stored desktop image) by creating a synthetic disk based on a selected template base image. For example, such a template base image may be a desktop image create by IT that contains a clean OS and some core applications. Hence, a new, clean VM can be provisioned almost instantly to a new user in an organization.

In various embodiments, a self-service web portal can be provided to users allowing a user to request that her physical desktop be instantly cloned to a VM. A short time after a user selects to clone her physical desktop, the user's desktop appears on her computing device. In various embodiments, the VM can be automatically disposed when the user logs off from the session and the changes in the delta disk can be flushed to the user's desktop image or deleted.

In an embodiment, to further improve user experience, the system can automatically detect when a user's physical machine did not contact the server for a long period of time and then predictively start the virtual cloning process, so that the user immediately gets access to her virtual desktop when logging into the self-service portal.

Figure 4:
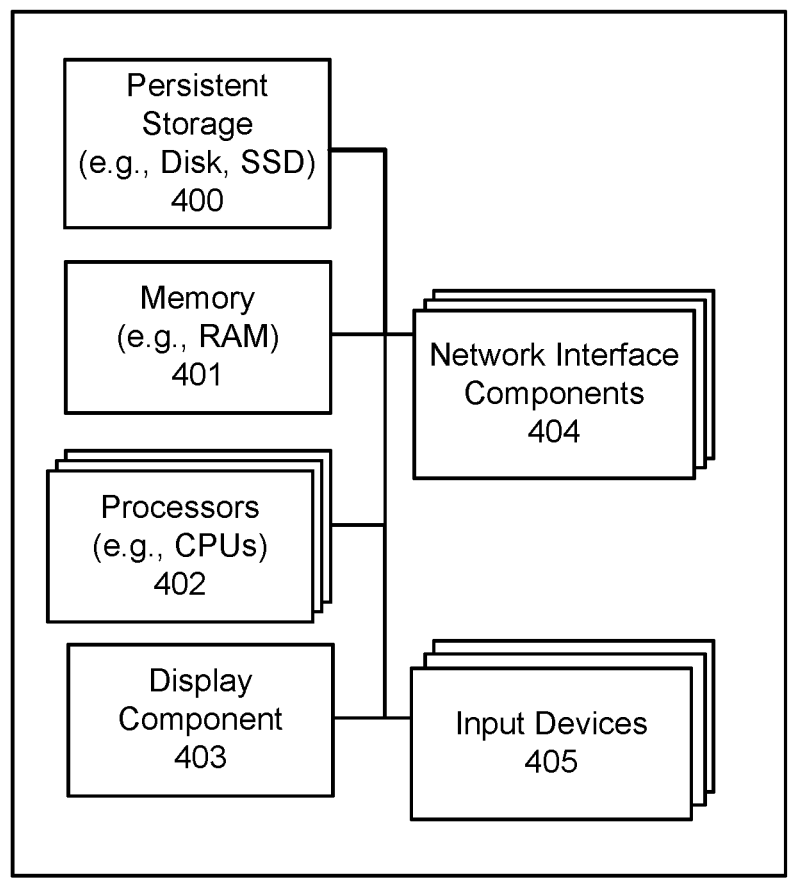
FIG. 4 illustrates an example of some general components of a computing device, in accordance with various embodiments.

FIG. 4 illustrates an example of some general components of a computing device that can be utilized in conjunction with various embodiments described in the present specification. In this particular example, the computing device includes one or more processors (e.g., central processing units (CPUs) 402 for executing instructions that can be stored in a storage medium. The storage medium may take the form of memory 401 (e.g., RAM), persistent storage 400 (e.g., disk, flash, SSD, etc.) or any combination thereof. As used herein, the terms "storage medium", "computer readable storage medium", and "non-transitory storage medium" are all used interchangeably and can include many different types of volatile memory or persistent storage, such as random access memory (RAM) storing program instructions for execution by the processor 402, a separate form of storage for images or data, a removable memory for sharing information with other devices and the like.

The computing device typically further comprises a display component 403, such as a computer monitor, a touch screen, liquid crystal display (LCD), light-emitting diode (LED) display, or the like. The display component 403 is conventionally used to display images or information to the user so that the user may interact with the computing device. In various embodiments, the computing device will also include a set of input devices 405 capable of receiving input from a user. This input can include, for example, a conventional keyboard, a mouse, a button, a touch pad, a touch screen, or any other such component whereby a user can input a command to the device, provide information to the device or otherwise interact with the device. In some embodiments, the computing device can include one or more network interface components (NICs) 404 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method, comprising:
   executing a virtual desktop on a virtual machine (VM) in a host server, the VM comprising a stub virtual machine disk, wherein the stub virtual machine disk contains stub files corresponding to files of a desktop image of the virtual desktop, the desktop image being located in a single instance store;
   receiving a request by the guest operating system to read a block from the stub virtual machine disk;
   redirecting the request to the desktop image in the single instance store;
   retrieving the block from the desktop image in response to the redirected request to read the block;
   receiving a request to write the block by the guest operating system;
   writing the block to a differencing virtual machine disk;
   receiving a request to read the block after the block has been written to the differencing virtual machine disk; and
   retrieving the block from the differencing virtual machine disk instead of the desktop image.

2. The method of claim 1, wherein the request is redirected based on a mapping of stub virtual machine disk blocks into corresponding single instance store file blocks.

3. The method of claim 2, wherein the mapping comprises a table that maps a stub virtual machine disk block offset into a corresponding single instance store file index and an offset within the file.

4. The method of claim 1, further comprising:
writing changes made by the guest operating system on the VM to a differencing virtual machine disk.

5. The method of claim 4, further comprising, flushing data from the differencing disk to the desktop image.

6. The method of claim 1, wherein the redirecting the request to the desktop image is performed by a disk input-output filter that intercepts read requests from the guest operating system to the stub virtual machine disk and redirects the read requests to the desktop image.

7. A computing device, comprising:
at least one processor; and
memory including instructions that, when executed by the at least one processor, cause the computing device to perform the operations of:
executing a virtual desktop on a virtual machine (VM) in a host server, the VM comprising a stub virtual machine disk, wherein the stub virtual machine disk contains stub files corresponding to files of a desktop image of the virtual desktop, the desktop image being located in a single instance store;
receiving a request by the guest operating system to read a block from the stub virtual machine disk;
redirecting the request to the desktop image in the single instance store;
retrieving the block from the desktop image in response to the redirected request to read the block;
receiving a request to write the block by the guest operating system;
writing the block to a differencing virtual machine disk;
receiving a request to read the block after the block has been written to the differencing virtual machine disk; and
retrieving the block from the differencing virtual machine disk instead of the desktop image.

8. The computing device of claim 7, wherein the request is redirected based on a mapping of stub virtual machine disk blocks into corresponding single instance store file blocks.

9. The computing device of claim 8, wherein the mapping comprises a table that maps a stub virtual machine disk block offset into a corresponding single instance store file index and an offset within the file.

10. The computing device of claim 7, wherein the memory further includes instructions that when executed by the at least one processor, cause the computing device to perform the operations of:
writing changes made by the guest operating system on the VM to a differencing virtual machine disk.

11. The computing device of claim 10, wherein the memory further includes instructions that when executed by the at least one processor, cause the computing device to perform the operations of:
flushing data from the differencing disk to the desktop image.

12. A non-transitory computer readable storage medium comprising one or more sequences of instructions, the instructions when executed by one or more processors causing the one or more processors to execute the operations of:
executing a virtual desktop on a virtual machine (VM) in a host server, the VM comprising a stub virtual machine disk, wherein the stub virtual machine disk contains stub files corresponding to files of a desktop image of the virtual desktop, the desktop image being located in a single instance store;
receiving a request by the guest operating system to read a block from the stub virtual machine disk;
redirecting the request to the desktop image in the single instance store;
retrieving the block from the desktop image in response to the redirected request to read the block;
receiving a request to write the block by the guest operating system;
writing the block to a differencing virtual machine disk;
receiving a request to read the block after the block has been written to the differencing virtual machine disk; and
retrieving the block from the differencing virtual machine disk instead of the desktop image.

13. The computing device of claim 7, wherein the redirecting the request to the desktop image is performed by a disk input-output filter that intercepts read requests from the guest operating system to the stub virtual machine disk and redirects the read requests to the desktop image.

14. The non-transitory computer readable storage medium of claim 12, wherein the request is redirected based on a mapping of stub virtual machine disk blocks into corresponding single instance store file blocks.

15. The non-transitory computer readable storage medium of claim 14, wherein the mapping comprises a table that maps a stub virtual machine disk block offset into a corresponding single instance store file index and an offset within the file.

16. The non-transitory computer readable storage medium of claim 12, further comprising instructions that when executed by the one or more processors cause the one or more processors to execute the operations of:
writing changes made by the guest operating system on the VM to a differencing virtual machine disk.

17. The non-transitory computer readable storage medium of claim 12, wherein the redirecting the request to the desktop image is performed by a disk input-output filter that intercepts read requests from the guest operating system to the stub virtual machine disk and redirects the read requests to the desktop image.

* * * * *